(12) United States Patent
Costantini et al.

(10) Patent No.: US 7,767,761 B2
(45) Date of Patent: Aug. 3, 2010

(54) COMPOSITIONS OBTAINED FROM RECYCLED POLYOLEFINS

(75) Inventors: Enrico Costantini, Ferrara (IT); Enrico Masarati, Piacenza (IT)

(73) Assignee: Basell Poliolefine Italia s.r.l., Milan (IT)

(*) Notice: Subject to any disclaimer, the term of this patent is extended or adjusted under 35 U.S.C. 154(b) by 0 days.

(21) Appl. No.: 12/086,369

(22) PCT Filed: Nov. 7, 2006

(86) PCT No.: PCT/EP2006/068189
§ 371 (c)(1), (2), (4) Date: Jun. 11, 2008

(87) PCT Pub. No.: WO2007/071494
PCT Pub. Date: Jun. 28, 2007

(65) Prior Publication Data
US 2009/0048403 A1 Feb. 19, 2009

Related U.S. Application Data

(60) Provisional application No. 60/800,597, filed on May 16, 2006.

(30) Foreign Application Priority Data
Dec. 21, 2005 (EP) .................. 05112587

(51) Int. Cl.
C08L 23/00 (2006.01)
C08L 23/04 (2006.01)
B32B 27/08 (2006.01)

(52) U.S. Cl. ............ 525/240; 525/191; 428/35.7; 428/36.8; 428/523

(58) Field of Classification Search ........... 525/191, 525/240; 428/35.7, 36.8, 523
See application file for complete search history.

(56) References Cited

U.S. PATENT DOCUMENTS 4,049,757 A * 9/1977 Kammel et al. ............ 264/470
5,030,662 A 7/1991 Banerjie
5,145,819 A 9/1992 Winter et al.
5,286,564 A 2/1994 Cecchin et al.
5,302,454 A 4/1994 Cecchin et al.
5,324,800 A 6/1994 Welborn, Jr. et al.
5,331,047 A * 7/1994 Giacobbe .................... 525/88
5,580,939 A 12/1996 Welborn, Jr. et al.
5,633,394 A 5/1997 Welborn, Jr. et al.
RE37,384 E 9/2001 Winter et al.
6,448,335 B1 9/2002 Braga et al.
6,461,703 B1 * 10/2002 Rigosi ................... 428/36.9
7,125,924 B2 * 10/2006 Credali et al. ............ 524/425
2003/0173104 A1 9/2003 Dell'Anna et al.
2004/0198919 A1 10/2004 Pelliconi et al.
2007/0203298 A1 8/2007 Massari et al.

FOREIGN PATENT DOCUMENTS

| | | |
|---|---|---|
| DE | 4226516 | 2/1994 |
| EP | 129368 | 12/1984 |
| EP | 400333 | 12/1990 |
| EP | 472946 | 3/1992 |
| EP | 485823 | 5/1992 |
| WO | 99/15584 | 4/1999 |
| WO | 99/21916 | 5/1999 |
| WO | 02/13204 | 2/2002 |
| WO | 03/011962 | 2/2003 |
| WO | WO 2004087803 | * 10/2004 |
| WO | 2005/113672 | 12/2005 |

OTHER PUBLICATIONS

E. Ramirez-Vargas et al., "Degradation effects on the rheological and mechanical properties of multi-extruded blends of impact-modified polypropylene and poly(ethylene-co-vinyl acetate)," *Polymer Degradation and Stability*, vol. 86(2), p. 301-307 (2004).

* cited by examiner

*Primary Examiner*—Vasu Jagannathan
*Assistant Examiner*—Irina Krylova
(74) *Attorney, Agent, or Firm*—Jarrod N. Raphael

(57) ABSTRACT

Polyolefin compositions comprising, by weight: A) 30-80% of a polyolefin component containing not less than 80% of a waste material selected from polyethylene, polypropylene or their mixtures; B) 20-70% of a heterophasic polyolefin composition having flexural modulus equal to or lower than 600 MPa.

15 Claims, No Drawings

COMPOSITIONS OBTAINED FROM RECYCLED POLYOLEFINS

Polyolefins, in particular polyethylene and polypropylene, are increasingly consumed in large amounts for many applications, including packaging for food and other goods, fibers, automotive components, and a great variety of manufactured articles. However the said massive use of polyolefins is creating a concern as regards the environmental impact of the waste materials generated after the first use.

In fact large amounts of waste plastic materials are presently coming from differential recovery of municipal plastic wastes, mainly constituted of flexible packaging (cast film, blown film and BOPP film), rigid packaging, blow moulded bottles and injection moulded containers. Through a step of separation from other polymers, such as PVC, PET or PS, two main polyolefinic fractions are obtained, namely polyethylenes (in particular LDPE, LLDPE) and polypropylenes (homopolymers, random copolymers, heterophasic copolymers); anyhow in these polymeric fractions impurities are present (e.g. aluminium coming from metallization of films and polyethylene terephthalate from blow moulded bottles). Actually, both the polypropylene and polyethylene materials can be present in the same fraction in significant amounts, so it is proper to say that the said two fractions are "polyethylene-rich" or "polypropylene-rich", depending on the prevailing component. Generally, the amount of polypropylene and/or polyethylene in the said fractions is of not less than 80% by weight.

Due to such heterogeneity and complexity in terms of main components and impurities, the problem of recycling the said waste polyolefin materials is still far from being optimally solved.

An important recycling route for plastic materials, including polyolefin materials, is represented by the so called "mechanical recycling", which can be defined as a material reprocessing into plastic items after a reworking step, generally carried out by regrinding or repelletising. In Europe the estimated proportion of waste plastics reprocessed in 2003 through mechanical recycling amounted to about 14%.

On the other hand, according to European Directive 94/62/EC, the target of mechanical recycling on total plastic packaging is of 20% in 2006 and 22.5% in 2008.

A serious obstacle playing against the growth of mechanical recycling of polyolefins is represented by the low quality, in terms of processability and in particular of mechanical properties, of the reworked material, strongly limiting the potential value of recycled polyolefins in many important applications, like sheets, laminates and geomembranes.

In fact, due to the said heterogeneity and to the degradation occurred during the stages of processing into articles first, and of recovering the waste after use, the waste polyolefin materials have poor mechanical properties.

Thus, to improve the mechanical properties of the said materials, it has been proposed to add relatively large amounts of fillers together with compatibilizing/coupling agents and elastomeric polymers, as described in U.S. Pat. No. 5,030,662.

It has now been found that the mechanical, and in particular the tensile properties of waste polyolefin materials are remarkably improved even in the absence of fillers and compatibilizing/coupling agents, by adding specific kinds of heterophasic compositions. Thus the present invention provides polyolefin compositions comprising, by weight (all percent amounts being by weight):

A) 30-80%, preferably 40-75% of a polyolefin component containing not less than 80% of a waste material selected from polyethylene, polypropylene or their mixtures;

B) 20-70%, preferably 25-60% of a heterophasic polyolefin composition having flexural modulus equal to or lower than 600 MPa, comprising (a) one or more propylene polymers selected from crystalline propylene homopolymers or copolymers of propylene with up to 10% of ethylene or other alpha-olefin comonomer(s) or their combinations, and (b) a copolymer or a composition of copolymers of ethylene with other alpha-olefins and optionally with minor amounts of a diene (typically from 1 to 10% with respect to the weight of (b)), said copolymer or composition containing 15% or more, in particular from 15% to 90%, preferably from 15 to 85% of ethylene.

In particular, the said alpha-olefin comonomers in the heterophasic composition (B) are selected from C4-C10 alpha-olefins for component (a) and C3-C10 alpha-olefins for component (b).

The heterophasic composition (B) preferably has a propylene content in the copolymer of component (a) ranging from 90 to 99% by weight. The polymer fraction insoluble in xylene at ambient temperature in said component (a) preferably ranges from 80 to 99% by weight in the case of homopolymers, and from 80 to 95% by weight in the case of copolymers.

Preferred are the heterophasic compositions wherein component (b) contains from 15% to 45%, more preferably from 20 to 40% of ethylene. This kind of heterophasic compositions confers high values of elongation at break and strength at break to the compositions of the present invention.

Other suitable heterophasic compositions are those wherein component (b) contains from more than 45 to 90%, preferably from 50 to 85% of ethylene. This kind of heterophasic compositions confers high values of elongation at break and satisfactory values of yield strength to the compositions of the present invention.

Due to the satisfactory tensile properties, the compositions of the present invention can be employed for films (with thickness of 400 microns or less) or for flexible foils (with thickness of more than 400 microns) such as geomembranes for agricultural, roofing, municipal ponds applications.

Typically, they are employed to produce the core layer of a multilayer sheet (e.g. a three layer geomembrane sheet), where the external layers are made of various kinds of polyolefin materials, in particular of heterophasic polyolefin compositions of the same kind as those used as the said component (B).

The compositions of the present invention can also be employed in injection moulding applications, optionally after treatment with visbreaking agents, like organic peroxides, using methods well known in the art.

The heterophasic composition (B) typically has a flow rate (ASTM D 1238, condition L, MFRL) ranging from 0.1 to 50 g/10 minutes, preferably from 0.5 to 20 g/10 minutes, elongation at break from 100% to 1000%, and flexural modulus (ASTM D 790) from 10 to 600 MPa, preferably from 20 to 500 MPa, more preferably from 20 to 400 MPa. Particular and preferred examples of compositions (B) are the heterophasic polyolefin compositions comprising (weight percentages):

1) 5-50%, preferably 10-50% of one or more propylene polymers selected from propylene homopolymers insoluble in xylene at ambient temperature in an amount of more that 80%, in particular from 85 to 99%, or copolymers of propylene with ethylene and/or C4-C10 alpha-olefin(s), containing 90% or more of propylene, and being insoluble in xylene at ambient temperature in an amount of more that 80%, in particular from 85 to 95% (component a);

2) 50-95%, preferably 50-90% of a fraction of one or more copolymer(s) of ethylene with propylene and/or C4-C10 alpha-olefin(s), and optionally minor quantities of a diene, said copolymer(s) containing from 15 to 90%, preferably from 15 to 85% of ethylene, and being soluble in xylene at ambient temperature (fraction b1); and 3) 0-30%, with respect to the sum of component (a) and fraction (b 1), of a copolymer fraction containing ethylene, said fraction being insoluble in xylene at ambient temperature (fraction b 2).

The solubility and insolubility of the said polymer components and fractions are defined as fractions soluble or insoluble in xylene at ambient temperature, i.e., around 25° C. Examples of the above mentioned C3-C10 and C4-C10 alpha-olefins present in composition (B) are propylene, butene-1, pentene-1,4-methylpentene, hexene-1, octene-1. The preferred comonomers are propylene and butene-1. The preferred comonomer in the propylene copolymers of component (a) is ethylene.

When present, the diene in composition (B) preferably ranges from 1 to 10%, more preferably 2.5-7% by weight with respect to the total weight of fraction (b 1). Examples of dienes are butadiene, 1,4-hexadiene, 1,5-hexadiene, and 5-ethylidene-2-norbornene.

When present, said fraction (b 2) preferably exceeds 1% by weight, more preferably ranging from 1 to 25% by weight with respect to the sum of component (a) and fraction (b 1). Preferably the content of ethylene in fraction (b 2) is at least 75% by weight, more preferably at least 80% by weight, with respect to the total weight of fraction (b 2). The comonomers in the copolymer of fraction (b 2) are preferably the same as those of the copolymer of fraction (b 1). An example of copolymer fraction (b 2) is an essentially linear semicrystalline copolymer of ethylene with propylene, a specific example of which is linear low density polyethylene (LLDPE).

The said heterophasic compositions can be prepared by blending component (a), fraction (b 1), and optionally fraction (b 2) in the molten state, that is to say at temperatures greater than their softening or melting point, or more preferably by sequential polymerization in the presence of a highly stereospecific Ziegler-Natta catalyst. In particular, the catalyst system used comprises (i) a solid catalytic component containing a titanium compound and an electron-donor compound, both supported on magnesium chloride, and (ii) an Al trialkyl compound and optionally an electron-donor compound.

Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823.

These metallocene catalysts may be used in particular to produce the component (b).

The above mentioned sequential polymerization process for the production of the heterophasic composition comprises at least two stages, where in one or more stage(s) propylene is polymerized, optionally in the presence of the said comonomer(s), to form component (a), and in one or more additional stage(s) mixtures of ethylene with said C3-C10 alpha-olefin(s), and optionally diene, are polymerized to form component (b).

The polymerization processes are carried out in liquid, gaseous, or liquid/gas phase. The reaction temperature in the various stages of polymerization can be equal or different, and generally ranges from 40 to 90° C., preferably from 50 to 80° C. for the production of component (a), and from 40 to 60° C. for the production of component (b).

Examples of sequential polymerization processes are described in European patent applications EP-A-472946 and EP-A-400333 and in WO03/011962.

As a way of example, the heterophasic composition (B) has MFR values ranging from 0.1 to 20 g/10 min, preferably from 0.2 to 15 g/10 min. The heterophasic composition with said melt flow rate values can be obtained directly during the polymerization process; as an alternative, said heterophasic composition can be subjected to a chemical visbreaking process carried out in the presence of the appropriate visbreaking agents, such as peroxides. Said chemical visbreaking process is carried out according to well known methods.

Typically, the total content of polymerized ethylene in the heterophasic composition (B) ranges from 15 to 60% by weight, in particular from 15 to 35% by weight.

The molecular weight of the various components and fractions of the heterophasic composition (B) (determined by measuring the intrinsic viscosity in tetrahydronaphtalene at 135° C.) varies in function of the nature of the components, and the total melt flow rate of the composition. In particular, the intrinsic viscosity is preferably comprised between the following limits: 0.5-3 dl/g for component (a), and 2-8 dl/g for component (b).

The polyolefin component (A) of the compositions of the present invention contains not less than 80% by weight, typically not less than 90% by weight, in particular from 80% or 90% up to 99% by weight, with respect to the total weight of the component, of a waste material selected from polyethylene or polypropylene or their mixtures.

The term "waste" is used to designate polymer materials deriving from at least one cycle of processing into manufactured articles, as opposed to virgin polymers. As previously mentioned, all kinds of polyethylene or polypropylene can be present. In particular, the polyethylene fraction can comprise one or more materials selected from high density polyethylene (HDPE), low density polyethylene (LDPE), linear low density polyethylene (LLDPE).

The polypropylene fraction can comprise one or more polymer materials selected from the following:

I) isotactic or mainly isotactic propylene homopolymers;

II) random copolymers of propylene with ethylene and/or C4-C8 α-olefins, such as for example 1-butene, 1-hexene, 1-octene, 4-methyl-1-pentene, wherein the total comonomer content ranges from 0.05% to 20% by weight, or mixtures of said copolymers with isotactic or mainly isotactic propylene homopolymers;

III) heterophasic copolymers comprising a propylene homopolymer and/or one of the copolymers of item II), and an elastomeric fraction comprising copolymers of ethylene with propylene and/or a C4-C8 α-olefin, optionally containing minor amounts of a diene, such as butadiene, 1,4-hexadiene, 1,5-hexadiene, ethylidene-1-norbornene.

Other polymeric materials typically present as impurities in component (A) are polystyrene, ethylene vinyl acetate copolymers, polyethylene terephthalate.

Other impurities that can be present in component (A) are metals (in particular Al) and additives, like fillers and pigments.

Another kind of components optionally present in the compositions of the present invention are reinforcing agents, in particular mineral fillers, like talc or calcium carbonate, or fibers, like glass fibers. The said reinforcing agents can for instance be added in amounts from 5 to 50% by weight with respect to the total weight of the composition.

To achieve increased levels of compatibilization among the various polymer components and with polar additives, like fillers and fibers, when present, the compositions of the present invention may comprise also compatibilizing and/or coupling agents, preferably in amounts from 0.5 to 10% by weight, more preferably from 0.5 to 5% by weight with respect to the total weight of the composition.

Examples of such compatibilizing/coupling agents are the polar-functional PP resins with oxygenated groups, like polypropylene grafted with maleic anhydride or with other compounds containing carboxylic groups, or polypropylene containing peroxide groups. Other additives conventionally used in polyolefin compositions, like pigments, stabilizers, biocidal agents, can be present as well.

The compositions of the present invention can be prepared by mechanically blending the said components using techniques known in the art for the preparation of polyolefin polymer blends. For example, one can use Banbury, Buss, or Brabender mixers, single-screw or twin-screw extruders at temperatures ranging from 180° C. to 260° C.

The following examples are given in order to illustrate but not limit the present invention. The methods used to obtain the data relative to the properties reported in the examples and the description are listed below.

| Property | Method |
| --- | --- |
| Melt Flow Rate (MFR) | ISO 1133 (230° C./2.16 kg), except where differently specified; |
| Flexural modulus | ISO method 178 with speed of 2 mm/min., on injection moulded specimens 4 mm thick, 80 mm long, 10 mm wide, injection moulded according to ISO 294; |
| Tensile modulus | ISO 527/-1, -2 with speed of 1 mm/min., on specimens (1b) cut from 4 mm thick plaques; |
| Tensile strength and elongation (yield and break) | ISO 527/-1, -2 with speed of 50 mm/min., on specimens (type V) cut from 2 mm thick plaques; |
| Notched Izod | ISO 180 with velocity of 3.46 m/s, on specimens (Notch type A) cut from 4 mm thick plaques; |
| Preparation of plaques | (see note 1 below); |
| Solubility in xylene | (see note 2 below). |

Note 1:
preparation of plaques
Plaque samples were prepared with a plate press Collin model P 200M at 200° C. for 270 sec without pressure and then at 150 bar pressure for 300 seconds; specimens were then left to cool to room temperature at a cooling rate of 15° C./min..
Plaque specimens:
120 × 120 × 4 mm for tensile modulus and Notched Izod impact measurements;
120 × 120 × 2 mm for tensile strengths/elongation measurements.
Note 2:
solubility in xylene
2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

EXAMPLES 1-10 AND COMPARISON EXAMPLES 1C-6C

The following materials were used in the examples.

Waste Polyolefinic Materials (Component (A))

The waste polyolefinic materials utilised in the examples were two samples delivered by Corepla (Italian Consortium for the collection, recovery, recycling of packaging plastic wastes). One sample was a PE (polyethylene)-rich material, hereinafter called "PE-A", and the other sample was a PP (polypropylene)-rich material, hereinafter called "PP-A", both in the form of regrind flakes. The two samples were analysed via transmission FTIR with Spectrophotometer Nicolet 20 SXB and via chemical elemental analysis. The compositions are reported in Table 1 below: in addition to PE and PP as major components, they contained smaller amounts of polar polymers, as polyethylene terephthalate (PET) and ethylene vinyl acetate copolymer (EVA), contained in barrier layers present in packaging items, so not separable mechanically from PE/PP, and minor amounts of polymer additives such as colour pigments, antiblocking agents, fillers.

TABLE 1

| Components (% by weight) | PE-A | PP-A |
| --- | --- | --- |
| PE | >90% | 47% |
| PP | 5% | >50% |
| PS | <1% | <1% |
| EVA | <0.2% | 0.10% |
| PET | 0.05 | 0.10% |
| $SiO_2$ | 0.25 | 0.15% |
| $CaCO_3$ | traces | traces |
| $TiO_2$, $Fe_2O_3$, colour pigments | traces | traces |
| Metals (Al) | traces | traces |

Note:
PS = polystyrene

Heterophasic Polyolefin Compositions (Component (B)) and Elastomers

HC1: heterophasic polyolefin composition having a MFR of 0.8 g/10 min. and flexural modulus of 1200 MPa, comprising (weight percentages):
  A. 82% of a crystalline propylene homopolymer containing 2% of fraction soluble in xylene at 25° C.;
  B. 18% of an ethylene/propylene copolymer containing 60% of ethylene, partially soluble in xylene at 25° C.

The total content of fraction soluble in xylene at 25° C. is of 15.5% by weight.

The composition is obtained by way of sequential polymerization in the presence of a high-yield and highly stereospecific Ziegler-Natta catalyst supported on $MgCl_2$.

HC2: heterophasic polyolefin composition having a MFR of 0.6 g/10 min. and flexural modulus of 80 MPa, comprising (weight percentages):
  A. 32% of a crystalline propylene random copolymer containing 3.5% of ethylene and about 6% of a fraction soluble in xylene at 25° C., and having an intrinsic viscosity [η] of 1.5 dl/g;
  B. 7.5% of an essentially linear ethylene/propylene copolymer totally insoluble in xylene at 25° C.; and
  C. 60.5% of an ethylene/propylene copolymer containing 25% of ethylene, totally soluble in xylene at 25° C., and having an intrinsic viscosity [η] of 3.2 dl/g.

The composition is obtained by way of sequential polymerization in the presence of a high-yield and highly stereospecific Ziegler-Natta catalyst supported on $MgCl_2$.

HC3: heterophasic polyolefin composition having a MFR value of about 0.6 g/10 min., flexural modulus of 20 MPa and a content of fraction soluble in xylene at room temperature of 76% by weight, and comprising (weight percentages) 17% of a crystalline copolymer of propylene with 3.3% of ethylene, and 83% of an elastomeric fraction of propylene with ethylene containing 32% of ethylene.

HC4: heterophasic polyolefin composition having a MFR value of about 3 g/10 min., flexural modulus of about 130 MPa, and comprising (weight percentages) 30% of a crystalline copolymer of propylene with 3.3% ethylene, and 70% of an elastomeric fraction of propylene with ethylene containing 22.5% of ethylene.

The composition is obtained by way of sequential polymerization in the presence of a high-yield and highly stereospecific Ziegler-Natta catalyst supported on MgCl$_2$.

HC5: obtained by visbreaking HC2 with organic peroxide, from a MFR of 0.6 to a final MFR of 8 g/10 min.

HC6: heterophasic polyolefin composition having a MFR of 0.6 g/10 min. and flexural modulus of 330 MPa, comprising (weight percentages):

A. 40% of a crystalline propylene homopolymer containing 2% of fraction soluble in xylene at 25° C.;
B. 60% of an ethylene/propylene copolymer containing 60% of ethylene, partially soluble in xylene at 25° C.

The total content of fraction soluble in xylene at 25° C. is of 47% by weight.

The composition is obtained by way of sequential polymerization in the presence of a high-yield and highly stereospecific Ziegler-Natta catalyst supported on MgCl$_2$.

EPR: ethylene-propylene copolymer rubber having an ethylene content of 72%, a Mooney viscosity of 60 (ML$_{1+4}$ at 125° C.) and density of 0.865 g/cm$^3$. Said copolymer is marketed by Polimeri Europa with the trademark Dutral CO038.

Eng.: copolymer containing 61% by weight of ethylene and 39% by weight of 1-octene, having a Mooney viscosity of 35 (ML$_{1+4}$ at 121° C.), MFR (190° C./2.16 kg) of 0.5 g/10 min. and a density of 0.868 g/cm$^3$. Said copolymer is marketed by Dow Chemical with the trademark Engage 8150.

Coupling Agents

As coupling agents for PET or metal/ionic impurities, the following materials were used:

Polybond 3200 (Crompton): propylene homopolymer grafted with maleic anhydride, with MFR (190° C./2.16 kg)=115 dg/min, maleic anhydride content=1% weight, density=0.91 g/cm$^3$, hereinafter called PP-MA;

X00071-53-4 OxyPP (Basell): a propylene homopolymer based resin containing active oxygenated groups, with MFR=1300 dg/min, density=0.90 g/cm$^3$, Flexural Modulus=1340 Mpa, hereinafter called OPP.

Processing Conditions

The compositions of the examples were obtained by mixing the components in a Bambury BY PL4.3 mixer apparatus operated at 164 rounds/min with piston pressure of 4 bar at a melt temperature of 200-210° C. for 5 minutes.

Relative amounts of components and final properties of the obtained compositions are give in Table 2 and Table 3 respectively.

TABLE 2

| Ex. No. | PE-A wt % | PP-A wt % | EPR wt % | Eng. wt % | HC1 wt % | HC2 wt % | HC3 wt % | HC4 wt % | HC5 wt % | HC6 wt % | PP-MA wt % | OPP wt % |
|---|---|---|---|---|---|---|---|---|---|---|---|---|
| 1 C | 60 | | | | 40 | | | | | | | |
| 1 | 70 | | | | | 30 | | | | | | |
| 2 | 50 | | | | | 50 | | | | | | |
| 3 | 50 | | | | | 48 | | | | | | 2 | |
| 4 | 50 | | | | | 47 | | | | | | | 3 |
| 5 | 60 | | | | | | | | | 40 | | | |
| 6 | 40 | | | | | | | | | 60 | | | |
| 7 | 58 | | | | | | | | | 40 | | 2 | |
| 2 C | 100 | | | | | | | | | | | | |
| 3 C | 70 | | 30 | | | | | | | | | | |
| 4 C | 50 | | 50 | | | | | | | | | | |
| 5 C | 60 | | | 40 | | | | | | | | | |
| 8 | 60 | | | | | | 40 | | | | | | |
| 6 C | | 100 | | | | | | | | | | | |
| 9 | | 50 | | | | | | | | 50 | | | |
| 10 | | 60 | | | | | | | | | 40 | | |

Notes:
C = Comparison; wt % = weight percent.

TABLE 3

| Ex. No. | MFR (g/10 min.) | TM (MPa) | IZOD 23° C. (KJ/m$^2$) | IZOD –20° C. (KJ/m$^2$) | Yield Strength (MPa) | Yield Elongation (%) | Strength at break (MPa) | Elongaation at break (%) |
|---|---|---|---|---|---|---|---|---|
| 1 C | 1.7 | 700 | 19 | 6 | 15 | 4 | 12 | 18 |
| 1 | 1.6 | 310 | NB | 20 | 7 | 10 | 10 | 90 |
| 2 | 1.4 | 240 | NB | NB | 6 | 40 | 14 | 620 |
| 3 | 1.3 | 260 | NB | NB | 8 | 24.5 | 19 | 480 |
| 4 | 1.3 | 250 | NB | NB | 6.5 | 11 | 16 | 500 |
| 5 | 1.6 | 370 | NB | 50 | 7.5 | 7 | 8 | 250 |
| 6 | 1.4 | 330 | NB | NB | 8 | 12 | 8.5 | 550 |
| 7 | 1.3 | 410 | NB | NB | 9 | 5 | 13 | 210 |
| 2 C | 2.2 | 390 | 2.5 | 2.2 | 7 | 3 | 7.5 | 4 |
| 3 C | 1.4 | 280 | NB | 28 | 7 | 13 | 7 | 105 |
| 4 C | 1.2 | 200 | NB | NB | 6 | 42 | 8 | 650 |
| 5 C | 1.7 | 230 | NB | NB | 6 | 20 | 7.5 | 430 |
| 8 | 1.2 | 240 | NB | NB | 6.5 | 32 | 11 | 460 |
| 6 C | 2.9 | 720 | 2.4 | 2.1 | 7.5 | 3 | 8.5 | 4 |
| 9 | 3.1 | 390 | NB | NB | 7 | 18 | 15.5 | 600 |
| 10 | 4.5 | 450 | NB | 40 | 7 | 11 | 13.5 | 310 |

Note:
TM = Tensile Modulus; NB = No Breakage.

The invention claimed is:

1. A polyolefin composition comprising, by weight:
   A) 30-80% of a polyolefin component comprising at least 80% of a waste material selected from polyethylene, polypropylene, or mixtures thereof;
   B) 20-70% of a heterophasic polyolefin composition comprising a flexural modulus equal to or lower than 600 MPa, the heterophasic polyolefin composition comprising (a) at least one propylene polymer selected from crystalline propylene homopolymers, or copolymers of propylene comprising up to 10% of ethylene or alpha-olefin comonomer(s) other than ethylene, and combinations thereof, and (b) an ethylene copolymer or a composition of copolymers comprising ethylene and at least one alpha-olefin, and optionally a minor amount of a diene, the ethylene copolymer or composition of copolymers comprising at least 15% of ethylene.

2. The polyolefin composition of claim 1, wherein component (b), the ethylene copolymer or the composition of copolymers comprising ethylene, comprises from 15 to 45% by weight of ethylene.

3. The polyolefin composition of claim 2, wherein the comonomer in component (b), the ethylene copolymer or the composition of copolymers comprising ethylene, is propylene.

4. The polyolefin composition of claim 1, wherein component (b), the ethylene copolymer or the composition of copolymers comprising ethylene, comprises from more than 45 to 90% by weight of ethylene.

5. The polyolefin composition of claim 4, wherein the comonomer in component (b), the ethylene copolymer or the composition of copolymers comprising ethylene, is propylene.

6. The polyolefin composition of claim 1, comprising from 50 to 95% by weight of component (b), the ethylene copolymer or the composition of copolymers comprising ethylene, with respect to the weight of (B), the heterophasic polyolefin composition.

7. The polyolefin composition of claim 1, wherein the heterophasic polyolefin composition (B) comprises (by weight):
   1) 5-50% of at least one propylene polymer selected from propylene homopolymers insoluble in xylene at ambient temperature in an amount of more that 80%, or copolymers of propylene with ethylene, at least one $C_4$-$C_{10}$ alpha-olefin, and combinations thereof, comprising 90% or more of propylene, and being insoluble in xylene at ambient temperature in an amount of more that 80% (component a);
   2) 50-95% of a fraction of at least one ethylene copolymer comprising propylene, at least one $C_4$-$C_{10}$ alpha-olefin, and combinations thereof, and optionally minor quantities of a diene, the ethylene copolymer comprising from 15 to 90% of ethylene and being soluble in xylene at ambient temperature (fraction b 1); and
   3) 0-30%, with respect to the sum of component (a) and fraction (b 1), of a copolymer fraction comprising ethylene, the fraction being insoluble in xylene at ambient temperature (fraction b 2).

8. The polyolefin composition of claim 1, wherein the heterophasic polyolefin composition (B) is prepared by sequential polymerization.

9. The polyolefin composition of claim 1, wherein the heterophasic polyolefin composition comprises a flexural modulus ranging from 10 to 600 MPa.

10. The polyolefin composition of claim 1, wherein the heterophasic polyolefin composition comprises a flexural modulus ranging from 20 to 500 MPa.

11. The polyolefin composition of claim 1, wherein the heterophasic polyolefin composition comprises a flexural modulus ranging from 20 to 400 MPa.

12. A polymer composition comprising a polyolefin composition comprising, by weight:
   A) 30-80% of a polyolefin component comprising at least 80% of a waste material selected from polyethylene, polypropylene, or mixtures thereof;
   B) 20-70% of a heterophasic polyolefin composition comprising a flexural modulus equal to or lower than 600 MPa, the heterophasic polyolefin composition comprising (a) at least one propylene polymer selected from crystalline propylene homopolymers, or copolymers of propylene comprising up to 10% of ethylene or alpha-olefin comonomer(s) other than ethylene, and combinations thereof, and (b) an ethylene copolymer or a composition of copolymers comprising ethylene and at least one alpha-olefin, and optionally a minor amount of a diene, the ethylene copolymer or composition of copolymers comprising at least 15% of ethylene.

13. A manufactured article comprising a polyolefin composition comprising, by weight:
   A) 30-80% of a polyolefin component comprising at least 80% of a waste material selected from polyethylene, polypropylene, or mixtures thereof;
   B) 20-70% of a heterophasic polyolefin composition comprising a flexural modulus equal to or lower than 600 MPa, the heterophasic polyolefin composition comprising (a) at least one propylene polymer selected from crystalline propylene homopolymers, or copolymers of propylene comprising up to 10% of ethylene or alpha-olefin comonomer(s) other than ethylene, and combinations thereof, and (b) an ethylene copolymer or a composition of copolymers comprising ethylene and at least one alpha-olefin, and optionally a minor amount of a diene, the ethylene copolymer or composition of copolymers comprising at least 15% of ethylene.

14. A film or flexible foil comprising a manufactured article comprising a polyolefin composition comprising, by weight:
   A) 30-80% of a polyolefin component comprising at least 80% of a waste material selected from polyethylene, polypropylene, or mixtures thereof;
   B) 20-70% of a heterophasic polyolefin composition comprising a flexural modulus equal to or lower than 600 MPa, the heterophasic polyolefin composition comprising (a) at least one propylene polymer selected from crystalline propylene homopolymers, or copolymers of propylene comprising up to 10% of ethylene or alpha-olefin comonomer(s) other than ethylene, and combinations thereof, and (b) an ethylene copolymer or a composition of copolymers comprising ethylene and at least one alpha-olefin, and optionally a minor amount of a diene, the ethylene copolymer or composition of copolymers comprising at least 15% of ethylene.

15. An injection molded article comprising a manufactured article comprising a polyolefin composition comprising, by weight:
   A) 30-80% of a polyolefin component comprising at least 80% of a waste material selected from polyethylene, polypropylene, or mixtures thereof;
   B) 20-70% of a heterophasic polyolefin composition comprising a flexural modulus equal to or lower than 600 MPa, the heterophasic polyolefin composition comprising (a) at least one propylene polymer selected from crystalline propylene homopolymers, or copolymers of propylene comprising up to 10% of ethylene or alpha-olefin comonomer(s) other than ethylene, and combinations thereof, and (b) an ethylene copolymer or a composition of copolymers comprising ethylene and at least one alpha-olefin, and optionally a minor amount of a diene, the ethylene copolymer or composition of copolymers comprising at least 15% of ethylene.

* * * * *